(No Model.)
D. J. HUCKINS.
FORK.
No. 406,735. Patented July 9, 1889.
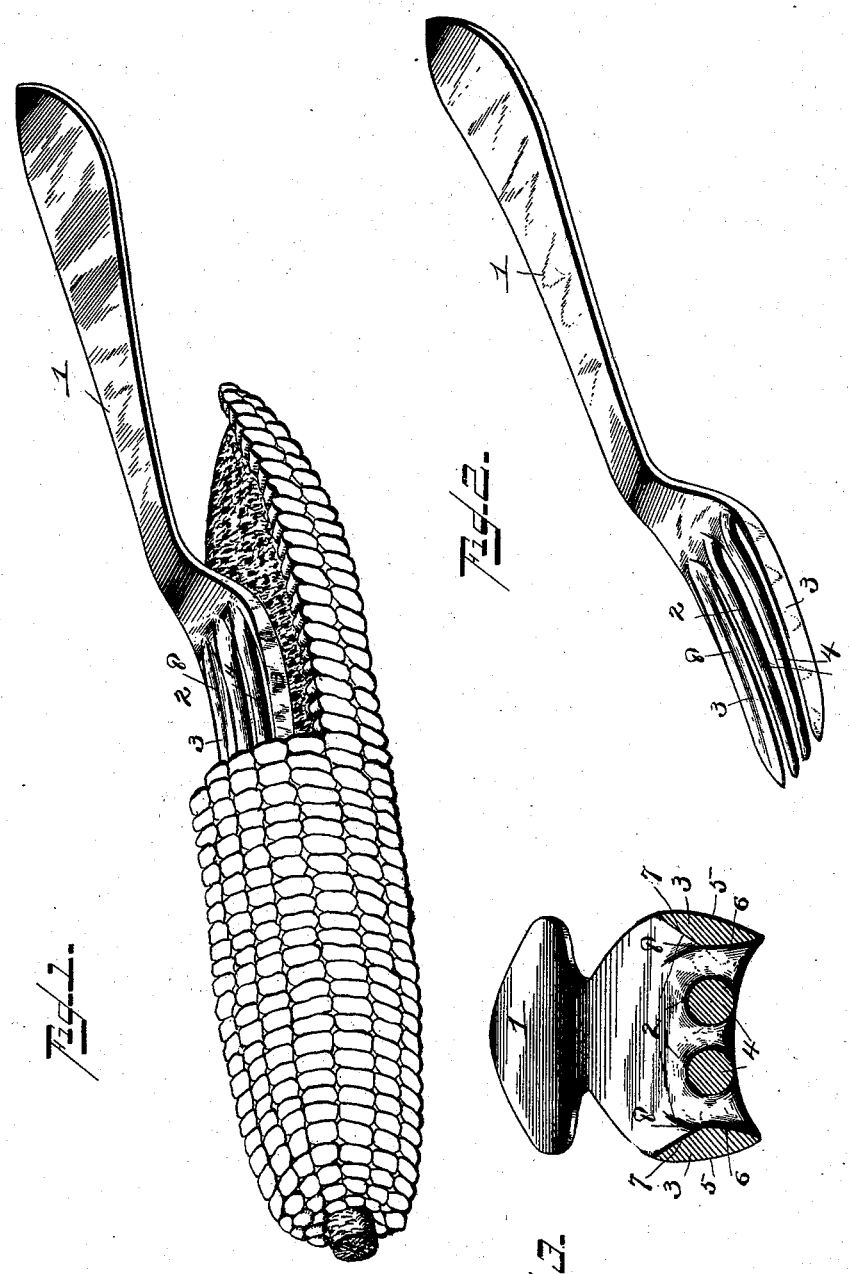
WITNESSES
F. L. Ourand
H. A. Smith
INVENTOR
Daniel J. Huckins
by Sans Bagger & Co.
Attorneys

UNITED STATES PATENT OFFICE.

DANIEL J. HUCKINS, OF EAST BOSTON, MASSACHUSETTS, ASSIGNOR OF ONE-HALF TO FRANK. D. BRIEVOGLE, OF SAME PLACE.

FORK.

SPECIFICATION forming part of Letters Patent No. 406,735, dated July 9, 1889.

Application filed April 10, 1889. Serial No. 306,660. (No model.)

*To all whom it may concern:*

Be it known that I, DANIEL J. HUCKINS, a citizen of the United States, and a resident of East Boston, in the county of Suffolk and State of Massachusetts, have invented certain new and useful Improvements in Table-Forks; and I do hereby declare that the following is a full, clear, and exact description of the invention, which will enable others skilled in the art to which it appertains to make and use the same.

This invention relates to table-forks.

The object is to produce a fork which shall be of such construction that it will extract the kernels from an ear of corn with readiness and ease, thereby obviating the necessity of cutting the kernels from the cob, and overcoming the objections attending the eating of corn from the cob. Furthermore, to produce a fork which shall be simple of construction, efficient and durable in use, and comparatively inexpensive of production.

With these objects in view the invention consists in a fork provided with two sets of tines, the inner set of which is approximately circular in cross-section and the outer set approximately elliptical. Furthermore, in the improved construction and combination of parts of a table-fork, as will be hereinafter fully described in the specification, illustrated in the drawings, and pointed out in the claim.

In the accompanying drawings, forming part of this specification, and in which like letters of reference indicate corresponding parts, I have illustrated one form of device embodying the essential features of my invention, although the same may be carried into effect in other ways without in the least departing from the spirit thereof, and in these drawings—

Figure 1 is a perspective view of my improved fork. Fig. 2 is a similar view showing the fork inserted into an ear of corn; and Fig. 3 is a cross-section taken through the tines, showing their peculiar configuration.

Referring to the drawings, 1 designates the handle of the fork, which is of the ordinary construction, and 2 the tines. As this fork is designed to perform a function not hitherto attempted—that is, of removing the kernels from a cob—the tines are constructed differently from those in ordinary use, and are of two configurations, performing two different functions.

The outer tines 3, as will be seen, are approximately elliptical in cross-section and are about three times the width of the inner tines 4, which are approximately circular in cross-section. The outer surfaces 5 of the tines 3 are formed with a regular curve, and are slightly inclined toward each other, while the inner surface is curved, as shown at 6, and the upper portion 7 is approximately straight. These tines, as will be seen in Fig. 2, are also pointed, as are also the tines 3, so that the fork may be used for other purposes than that of simply removing corn from the cob.

Having described the peculiar construction of my device, I will proceed to show its manner of operation.

The cob is held in one hand and the sharp portions of the ends of the tines are inserted between the kernels and then pushed toward the opposite end of the cob. As the outer tines 3 are wider than the inner tines 4, it will follow that they act simply as a fulcrum, and by the time the fork has been pushed in the entire length of the tines the kernels will have become sufficiently loosened to be removed by simply pressing down the outer end or handle portion of the fork. The shoulders 8 on the tines 3 serve to prevent the kernels slipping between the tines when the handle is forced down, while the upper portion 7 acts as a guard to prevent the corn dropping off from the fork after it has been removed from the cob, and while being conveyed to the mouth. By reason of the circular tines being arranged between the elliptical tines, and the said elliptical tines being of greater diameter than the circular tines an arch is provided between the elliptical tines, and this arch allows the circular tines to rest on the cob and enables the kernels of the corn to be removed with ease and facility. I have only shown in this instance a fork having two of the circular tines and two of the elliptical tines; but it is evident that the number may be increased, if desired. It will also be found that this fork will be highly efficient in use as a pie-fork, as the outer tines will act somewhat as a knife by reason of the sharp edge 8 of the outer tines, so that the crust may be readily broken.

Although I have shown the tines of the fork approximately circular in cross-section and elliptical in cross-section, it is obvious that I may construct them in other forms—as, for example, by making the outer tines circular in cross-section, but of greater diameter than the inner tines; but for obvious reasons the form shown is preferred.

This device, although exceedingly simple, will be found to be of the highest efficiency in use, and one that will fill a long-felt want, as the discomfiture attending the eating of corn from a cob will be obviated.

Having thus fully described my invention, what I claim as new, and desire to secure by Letters Patent, is—

The herein-described fork having the intermediate circular tines and the outer elliptical tines of greater width than the circular tines, whereby an arch is formed between the outer tines which rest upon the cob when in use, substantially as described.

In testimony that I claim the foregoing as my own I have hereunto affixed my signature in presence of two witnesses.

DANIEL J. HUCKINS.

Witnesses:
WILLIAM A. PEARSON,
EDWARD SHIELDS.